(12) United States Patent
Gao et al.

(10) Patent No.: US 12,284,533 B2
(45) Date of Patent: Apr. 22, 2025

(54) TECHNIQUES FOR ADAPTIVE SCHEDULING IN IDLE MODE

(71) Applicant: QUALCOMM Incorporated, San Diego, CA (US)

(72) Inventors: Kang Gao, San Diego, CA (US); Jun Zhu, San Diego, CA (US); Ruhua He, San Diego, CA (US); Raghu Narayan Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 492 days.

(21) Appl. No.: 17/665,358

(22) Filed: Feb. 4, 2022

(65) Prior Publication Data

US 2023/0254707 A1     Aug. 10, 2023

(51) Int. Cl.
*H04W 16/28* (2009.01)
*H04W 24/08* (2009.01)
*H04W 24/10* (2009.01)
*H04W 68/00* (2009.01)

(52) U.S. Cl.
CPC ........... *H04W 16/28* (2013.01); *H04W 24/08* (2013.01); *H04W 24/10* (2013.01); *H04W 68/005* (2013.01)

(58) Field of Classification Search
CPC ..... H04W 16/28; H04W 24/08; H04W 24/10; H04W 68/005; H04W 68/02
See application file for complete search history.

(56) References Cited

U.S. PATENT DOCUMENTS

| | | | | |
|---|---|---|---|---|
| 2021/0153162 A1* | 5/2021 | Chen | .................. | H04W 56/001 |
| 2022/0150726 A1* | 5/2022 | Laselva | ............ | H04W 52/0245 |
| 2023/0087707 A1* | 3/2023 | Yan | ....................... | H04W 76/28 |
| | | | | 370/503 |

* cited by examiner

*Primary Examiner* — Sharmin Chowdhury
(74) *Attorney, Agent, or Firm* — Paul M. McAdams; Holland & Hart LLP

(57) ABSTRACT

Methods, systems, and devices for wireless communications are described. A wireless communications system may support adaptive scheduling in idle mode. In some cases, a user equipment (UE) may receive control signaling indicating a first beam sweeping occasion and a first paging occasion within a search time period. The UE may select a first quantity of measurement occasions of the first beam sweeping occasion for monitoring multiple beams. The first quantity of measurement occasions may be based on a channel quality metric observed for a prior beam during a prior beam sweeping occasion. The UE may select a first beam to monitor for a first paging message during the first paging occasion based on respective channel quality metrics observed for multiple beams during the first quantity of measurement occasions. Further, the UE may monitor for the first paging message during the first paging occasion using the first beam.

30 Claims, 11 Drawing Sheets

TECHNIQUES FOR ADAPTIVE SCHEDULING IN IDLE MODE

FIELD OF TECHNOLOGY

The following relates to wireless communications, including techniques for adaptive scheduling in idle mode.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a wireless device may support messaging associated with a paging procedure. For example, a network device may transmit a paging message indicating that the network device has data to communicate with a user equipment (UE). The UE may monitor for such paging messages and initiate communications for the data based on receiving the paging message. However, conventional techniques for paging may result in relatively high power consumption, poor battery life, or inefficient communications.

SUMMARY

The described techniques relate to improved methods, systems, devices, and apparatuses that support techniques for adaptive scheduling in idle mode. Generally, the described techniques provide for adaptively selecting a quantity of measurement occasions to measure beams associated with a paging occasion based on channel conditions. For example, a network device may transmit control signaling to a user equipment (UE) indicating a first beam sweeping occasion and a first paging occasion within a search time period. The UE may measure beams during a first quantity of measurement occasions of the first beam sweeping occasion. The UE may select one or more beams to monitor for a paging message in the first paging occasion based on the measuring. For example, the UE may monitor for a paging message using a first beam of multiple beams based on channel quality metrics measured for the multiple beams during the first quantity of measurement occasions (e.g., a signal-to-noise ratio (SNR) or other examples of channel quality metrics).

In accordance with the techniques described herein, the UE may select the first quantity of measurement occasions based on channel conditions, a configuration, or a combination thereof. As an example, the first quantity of measurement occasions may be based on a first channel quality metric of a prior beam associated with a prior beam sweeping occasion. That is, the UE may maintain or update a previous quantity of measurement occasions based on comparing the first channel quality metric to one or more thresholds. In some other examples, the UE may select the first quantity of measurement occasions based on an initial quantity of measurement occasions of the configuration (e.g., the network device may signal a configuration indicating the initial or default quantity of measurement occasions, or the UE may be pre-configured with the initial or default quantity). In some examples, the UE may adaptively select the quantity of measurement occasions throughout the search time period. For example, the UE may select a second quantity of measurement occasions for a second beam sweeping occasion. The second quantity of measurement occasions may be based on a second channel quality metric observed for the first beam during the first beam sweeping occasion. Thus, in some examples, the UE may select a relatively high quantity of measurement occasions (e.g., in relatively poor channel conditions) or a relatively low quantity of measurement occasions (e.g., in relatively good channel conditions) based on metrics for previous beam sweeping occasions, which may result in improved power efficiency, communications reliability, or a combination thereof.

A method for wireless communications at a user equipment (UE) is described. The method may include receiving control signaling indicating a first beam sweeping occasion within a search time period and a first paging occasion within the search time period, selecting a first quantity of measurement occasions of the first beam sweeping occasion for monitoring of a first set of multiple beams based on a channel quality metric observed for a prior beam during a prior beam sweeping occasion, selecting a first beam of the first set of multiple beams to monitor for a first paging message during the first paging occasion based on a first set of multiple channel quality metrics observed for the first set of multiple beams during the first quantity of measurement occasions, and monitoring for the first paging message during the first paging occasion using the first beam.

An apparatus for wireless communications at a UE is described. The apparatus may include a processor, memory coupled with the processor, and instructions stored in the memory. The instructions may be executable by the processor to cause the apparatus to receive control signaling indicating a first beam sweeping occasion within a search time period and a first paging occasion within the search time period, select a first quantity of measurement occasions of the first beam sweeping occasion for monitoring of a first set of multiple beams based on a channel quality metric observed for a prior beam during a prior beam sweeping occasion, select a first beam of the first set of multiple beams to monitor for a first paging message during the first paging occasion based on a first set of multiple channel quality metrics observed for the first set of multiple beams during the first quantity of measurement occasions, and monitor for the first paging message during the first paging occasion using the first beam.

Another apparatus for wireless communications at a UE is described. The apparatus may include means for receiving control signaling indicating a first beam sweeping occasion within a search time period and a first paging occasion within the search time period, means for selecting a first quantity of measurement occasions of the first beam sweeping occasion for monitoring of a first set of multiple beams based on a channel quality metric observed for a prior beam during a prior beam sweeping occasion, means for selecting a first beam of the first set of multiple beams to monitor for a first paging message during the first paging occasion based on a first set of multiple channel quality metrics observed for the first set of multiple beams during the first quantity of measurement occasions, and means for monitoring for the first paging message during the first paging occasion using the first beam.

A non-transitory computer-readable medium storing code for wireless communications at a UE is described. The code may include instructions executable by a processor to receive control signaling indicating a first beam sweeping occasion within a search time period and a first paging occasion within the search time period, select a first quantity of measurement occasions of the first beam sweeping occasion for monitoring of a first set of multiple beams based on a channel quality metric observed for a prior beam during a prior beam sweeping occasion, select a first beam of the first set of multiple beams to monitor for a first paging message during the first paging occasion based on a first set of multiple channel quality metrics observed for the first set of multiple beams during the first quantity of measurement occasions, and monitor for the first paging message during the first paging occasion using the first beam.

Some examples of the method, apparatuses, and non-transitory computer-readable medium described herein may further include operations, features, means, or instructions for receiving the control signaling indicating a second beam sweeping occasion within the search time period and a second paging occasion within the search time period, selecting a second quantity of measurement occasions of the second beam sweeping occasion for monitoring of a second set of multiple beams based on the channel quality metric observed for the first beam during the first beam sweeping occasion, selecting a second beam of the second set of multiple beams to monitor for a second paging message during the second paging occasion based on a second set of multiple channel quality metrics observed for the second set of multiple beams during the second quantity of measurement occasions, and monitoring for the second paging message during the second paging occasion using the second beam.

Some examples of the method, apparatuses, and non-transitory computer-readable medium described herein may further include operations, features, means, or instructions for comparing the channel quality metric observed for the first beam during the first beam sweeping occasion to one or more thresholds, where selecting the second quantity of measurement occasions may be based on the comparison.

In some examples of the method, apparatuses, and non-transitory computer-readable medium described herein, selecting the first quantity of measurement occasions may include operations, features, means, or instructions for selecting a first value for the first quantity of measurement occasions in accordance with a first value of the channel quality metric observed for the prior beam during the prior beam sweeping occasion and selecting a second value for the first quantity of measurement occasions in accordance with a second value of the channel quality metric observed for the prior beam during the prior beam sweeping occasion.

Some examples of the method, apparatuses, and non-transitory computer-readable medium described herein may further include operations, features, means, or instructions for determining an initial quantity of measurement occasions for the search time period based on receiving the control signaling.

Some examples of the method, apparatuses, and non-transitory computer-readable medium described herein may further include operations, features, means, or instructions for measuring the prior beam associated with the prior beam sweeping occasion to obtain the channel quality metric, where the prior beam may be further associated with a previous paging message.

Some examples of the method, apparatuses, and non-transitory computer-readable medium described herein may further include operations, features, means, or instructions for comparing the channel quality metric observed for the prior beam during the prior beam sweeping occasion to one or more thresholds, where selecting the first quantity of measurement occasions may be based on the comparison.

Some examples of the method, apparatuses, and non-transitory computer-readable medium described herein may further include operations, features, means, or instructions for receiving sensor information from a sensor at the UE, where selecting the first quantity of measurement occasions may be based on the sensor information.

Some examples of the method, apparatuses, and non-transitory computer-readable medium described herein may further include operations, features, means, or instructions for operating in an idle mode, where monitoring for the first paging message may be based on operating in the idle mode.

In some examples of the method, apparatuses, and non-transitory computer-readable medium described herein, the first beam sweeping occasion may be associated with one or more synchronization signal blocks.

In some examples of the method, apparatuses, and non-transitory computer-readable medium described herein, the channel quality metric includes a signal-to-noise ratio (SNR), a reference signal received power (RSRP), or both.

In some examples of the method, apparatuses, and non-transitory computer-readable medium described herein, a first value for the first quantity of measurement occasions may be associated with a first power consumption of the UE, and a second value for the first quantity of measurement occasions may be associated with a second power consumption of the UE.

DETAILED DESCRIPTION

Figure 1:
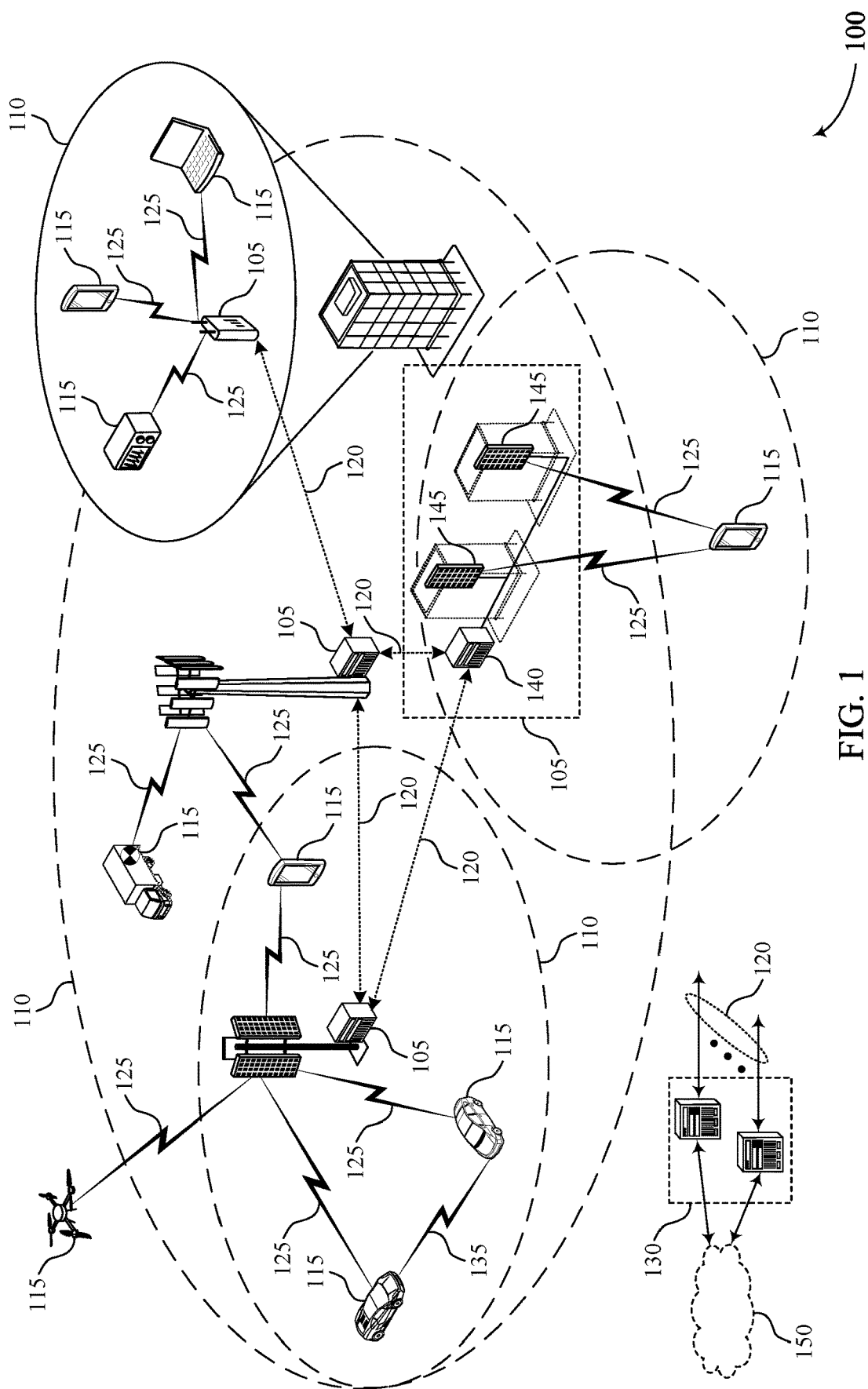
FIG. 1 illustrates an example of a wireless communications system that supports techniques for adaptive scheduling in idle mode in accordance with aspects of the present disclosure.

Some wireless communication systems may support messaging associated with a paging procedure. For example, a network device may configure a user equipment (UE) with a search time period associated with the paging procedure including a set of paging cycles. Each paging cycle may include a beam sweeping occasion, a loop occasion, and a paging occasion. The beam sweeping occasion may include a quantity of measurement occasions in which the UE may measure the channel quality of one of more beams associated with the beam sweeping occasion. The UE may select a beam to monitor for a paging message associated with the paging occasion using the quantity of measurement occasions. The UE may perform a frequency tracking loop (FTL) and a time tracking loop (TTL) based on the selected beam and may monitor the selected beam for the paging message during the paging occasion. However, conventional techniques for paging procedures may result in relatively high power consumption or relatively poor beam selection.

Accordingly, the techniques as described herein may support adaptive scheduling, which may enable a UE to dynamically select a quantity of measurement occasions to measure beams during a paging cycle, for example, based on channel conditions. By selecting a relatively high quantity of occasions (e.g., based on relatively poor channel conditions), the UE may select beams for the paging cycle with relatively more accuracy, and thus may realize improved communications reliability and efficiency. By selecting a relatively low quantity of occasions, the UE may realize reduced power consumption while maintaining reliable beam selection (e.g., due to relatively good channel conditions).

For example, a network device may transmit control signaling to the UE indicating a search time period, a first beam sweeping occasion, and an associated first paging occasion within the search time period. The UE may select a first quantity of measurement occasions to measure a set of beams associated with the first beam sweeping occasion. As an illustrative example, each measurement occasion may be an example of a synchronization signal burst set (SSBS) or a synchronization signal block (SSB), among other examples of measurement occasions for beam selection (e.g., beam refinement). In some cases, the first quantity of measurement occasions may be based on a first channel quality metric of a prior beam associated with a prior beam sweeping occasion. For example, the UE may obtain the first channel quality metric of the prior beam sweeping occasion within the search period, and adjust or maintain the quantity of measurement occasions used for beam refinement based on the first channel quality metric. In some examples, the first beam sweeping occasion may be an initial beam sweeping occasion of the search period, and the UE may be configured with a default or initial quantity of measurement occasions.

The UE may select a beam for monitoring for a first paging message associated with the first paging occasion based on the results of the beam sweeping occasion having the first quantity of measurement occasions. In some cases, the UE may measure the channel quality of the selected beam to determine a second channel quality metric. The UE may compare the second channel quality metric to one or more thresholds and select a second quantity of measurement occasions for a second beam sweeping occasion associated with a second paging occasion based on the comparison. For example, the second channel quality metric may be greater than a threshold and the UE may select the second quantity of measurement occasions such that the second quantity of measurement occasions is less than the first quantity of measurement occasions, which may result in reduced power consumption (e.g., due to the reduced quantity of measurement occasions for beam selection). In some other cases, the second channel quality metric may be less than the threshold and the UE may select the second quantity of measurement occasions, such that the second set of measurement occasions is greater than the first quantity of measurement occasions, which may result in increased communication reliability (e.g., due to the increased quantity of measurement occasions for beam selection). In yet some other cases, the second channel quality metric may satisfy a threshold and the UE may use a same value for the first and second quantities of measurement occasions.

In some cases, the UE may receive sensor information from a sensor at the UE and may select the second quantity of measurement occasions based on the sensor information. For example, a sensor at the UE may indicate that the UE is stationary, and the UE may select the second quantity of measurement occasions according to a threshold value (e.g., a minimum value).

Aspects of the disclosure are initially described in the context of wireless communications systems. Aspects are then described with reference to a paging procedure, an adaptive scheduling process, and a process flow. Aspects of the disclosure are further illustrated by and described with reference to apparatus diagrams, system diagrams, and flowcharts that relate to techniques for adaptive scheduling in idle mode.

FIG. 1 illustrates an example of a wireless communications system 100 that supports techniques for adaptive scheduling in idle mode in accordance with aspects of the present disclosure. The wireless communications system 100 may include one or more network devices 105 (e.g., base stations 105), one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, network device 105 (e.g., base station 105), entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may support techniques for adaptive scheduling in idle mode as described herein. That is, devices of the wireless communications system 100 may dynamically select quantities of measurement occasions as described herein. Although described as a UE 115 and a network device (e.g., a base station 105 or another network device, which may additionally or alternatively be referred to as a network entity) performing the operations and techniques described herein, it is to be understood that any device of the wireless communications system 100 may additionally or alternatively perform the operations and techniques.

As an illustrative example, a UE 115 may receive control signaling indicating a first beam sweeping occasion and a first paging occasion within a search time period. The UE 115 may select a first quantity of measurement occasions of the first beam sweeping occasion for measuring multiple beams. In some cases, the first quantity may be based on a channel quality metric observed for a prior beam during a prior beam sweeping occasion, a configuration indicating an initial or default quantity, or a combination thereof. The UE 115 may select a first beam to monitor the first paging occasion for a first paging message based on the first quantity of measurement occasions (e.g., the UE 115 may select the beam based on the beam having a metric, such as SNR, higher than the metrics of the other beams measured during the measurement occasions). In some examples, the UE 115 may iterate such techniques to adaptively adjust the quantity of measurement occasions measured by the UE 115. For example, the UE 115 may measure the channel quality of the selected beam to determine a channel quality metric. The UE 115 may compare the channel quality metric to one or more thresholds and select a second quantity of measurement occasions for a second beam sweeping occasion associated with a second paging occasion based on the comparison. Thus, the UE 115 may select a second beam for monitoring the second paging occasion based on a channel metric associated with the first beam, enabling the UE 115 to increase the quantity of measurement occasions measured by the UE 115 (e.g., in poor channel conditions such that the beam sweeping procedure is more accurate), decrease the quantity of measurement occasions measured by the UE 115 (e.g., in good channel conditions such that the UE 115 saves power, for example, when operating in an idle mode), or maintain a quantity of measured occasions based on the channel metric satisfying one or more thresholds.

Figure 2:
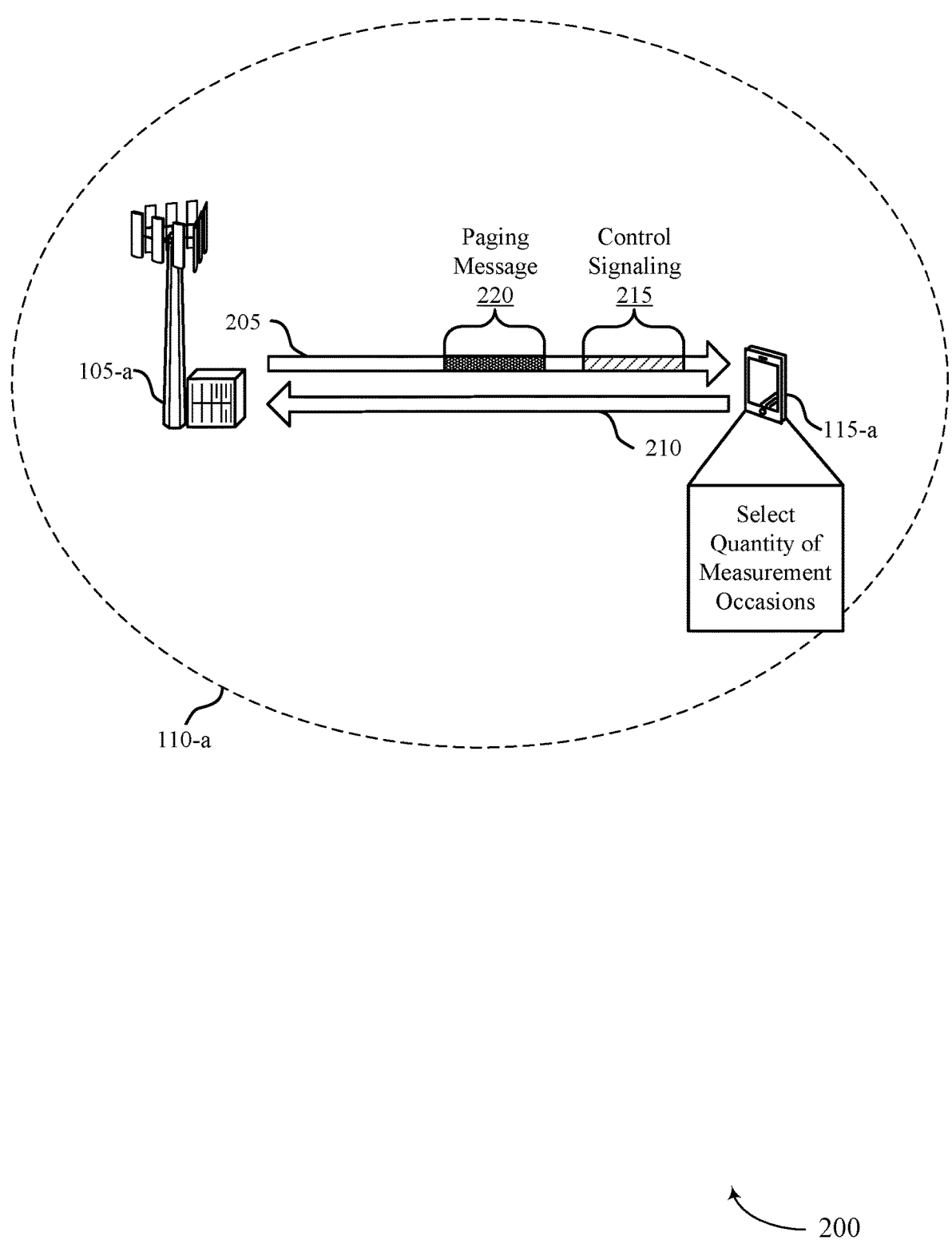
FIG. 2 illustrates an example of a wireless communications system that supports techniques for adaptive scheduling in idle mode in accordance with aspects of the present disclosure.

FIG. 2 illustrates an example of wireless communications system 200 that supports techniques for adaptive scheduling in idle mode in accordance with aspects of the present disclosure. In some examples, wireless communications system 200 may implement aspects of wireless communications system 100 and may include a UE 115-a and a network device 105-a, which may be examples of a UE 115 and a base station 105 and may communicate with one another as described above with reference to FIG. 1. For example, the network device 105-a may transmit downlink communications 205 to the UE 115-a via a communication link as described with reference to FIG. 1. The UE 115-a may transmit the uplink communications 210 to the network device 105 a via a respective communication link.

Some wireless communication systems may support messaging associated with a paging procedure. For example, a first wireless device, such as the network device 105-a, may configure a second wireless device, such as the UE 115-a, with a search time period (e.g., a search period) associated with the paging procedure. The search time period may be a time period in which the UE 115 may detect a new cell (e.g., via a synchronization signal block (SSB)). For example, time frequency resources for the search time period may be configured (e.g., via control signaling 215 from the network device 105-a) and the UE 115-a may monitor for a new cell, new SSB, one or more paging messages 220, and the like during the search time period (e.g., when the UE 115-a is operating in an idle mode). In some cases, the network device 105 may determine the search time period based on a threshold time period.

The paging procedure may include a set of paging cycles and each paging cycle may include a beam sweeping occasion (e.g., autonomous beam refinement), a loop occasion, and a paging occasion. The beam sweeping occasion may include a quantity of measurement occasions in which the UE 115-a may measure the channel quality associated with one of more beams. The network device 105-a may configure the UE 115-a with the quantity of measurement occasions, loop occasion parameters, and a periodicity of paging occasions. That is, the UE 115-a may determine when one or more paging occasions may occur based on the periodicity configured by the network device 105-a. Stated alternatively, the periodicity may indicate a time duration between paging occasions that the UE 115-a may monitor for respective paging messages 220. Additionally or alternatively, the quantity of measurement occasions may include one or more occasions (e.g., time frequency resources, reference signals transmitted via such resources) in which the UE 115-a may measure or otherwise estimate the channel quality of one of more beams associated with a respective beam sweeping occasion (e.g., measurements used for beam refinement and/or selection).

The UE 115-a may perform beam selection or refinement using the quantity of measurement occasions based on the paging occasion. For example, the UE 115-a may perform the quantity of measurement occasions prior to the paging occasion. The UE 115-a may select a beam (e.g., a network device 105-a to UE 115-a beam pair) to monitor for a paging message 220 (e.g., a page) during the paging occasion based on performing the beam selection or refinement using the quantity of measurement occasions. Additionally or alternatively, the UE 115-a may perform a frequency tracking loop (FTL) and a time tracking loop (TTL) associated with the loop occasion based on the selected beam. For example, the UE 115-*a* may perform the FTL and TTL to track the frequency and time of the incoming signal over the selected beam to support synchronization and thus improve the reliability of receiving the paging message 220. The UE 115-*a* may monitor for the paging message using the selected one or more beams during the paging occasion. However, conventional techniques for paging may result in relatively high power consumption, for example, if the UE 115-*a* is operating in an idle mode.

Accordingly, the wireless communications system 200 (e.g., operating in a millimeter wave (mmW) range) may support techniques for adaptive scheduling (e.g., beam management) in idle mode. For example, the UE 115-*a* may support techniques to dynamically select a quantity of measurement occasions to measure a set of beams associated with a beam sweeping occasion during a paging cycle, for example, based on channel conditions. Such techniques may support improved communications and/or reduced power consumption, among other benefits (e.g., in a system supporting mmW communications as described herein, among other examples of systems and communications).

For example, the network device 105-*a* may transmit, to the UE 115-*a*, control signaling 215 indicating a configuration for a search time period (e.g., search period) associated with a paging procedure. For example, the configuration may indicate one or more paging occasions for communicating paging messages 220, one or more beam sweeping occasions (e.g., each beam sweeping occasion associated with a respective paging occasion within the search time period). In some cases, the control signaling 215 may indicate an initial (e.g., default) quantity of measurement occasions. The UE 115-*a* may use the initial quantity of measurement occasions associated with an initial beam sweeping occasion in a search time period to determine a beam to monitor for an initial paging message 220. The UE 115-*a* may monitor for the paging message 220 using the selected beam during the first paging occasion. The UE 115-*a* may measure or estimate the channel quality of the selected beam to determine a channel quality metric. For example, the UE 115-*a* may measure a reference signal during a measurement occasion to obtain an SNR associated with the beam and the respective channel, although any example of channel metrics and methods for obtaining the channel metrics may be used (e.g., the UE 115-*a* may obtain, measure, or estimate an SNR associated with the beam, a reference signal received power (RSRP) associated with the beam, or other examples of metrics associated with the beam or indicating a quality of the channel).

In some examples, the UE 115-*a* may compare the channel quality metric associated with a prior beam (e.g., the beam selected from a prior beam sweeping occasion) to one or more thresholds. The UE 115-*a* may select a second quantity of measurement occasions associated with a second paging occasion (e.g., a paging occasion occurring after the first or initial paging occasion) based on the comparison. As an illustrative example, the UE 115-*a* may measure the selected beam to determine an SNR of the selected beam. In some cases, the SNR of the selected beam may be greater than a threshold (e.g., −4 decibels). For example, the UE 115-*a* may operate according to a mmW range and may experience strong signal strength (e.g., due to a high SNR capacity), resulting in an SNR greater than the threshold. In some such examples, the UE 115-*a* may select the second quantity of measurement occasions such that the second quantity of measurement occasions is less than the initial quantity of measurement occasions (e.g., reducing power consumption due to the UE 115-*a* realizing less beam refinement processing overhead as a result of the reduced quantity of measurement occasions). Additionally or alternatively, the second quantity of measurement occasions may be a threshold (e.g., minimum) quantity of measurement occasions.

In some other cases, the SNR may be less than the threshold. For example, the UE 115-*a* may operate according to the mmW range and may experience signal disruption (e.g., due to mobility scenarios), resulting in an SNR less than the threshold. In some such examples, the UE 115-*a* may select the second quantity of measurement occasions such that the second quantity of measurement occasions is greater than the initial quantity of measurement occasions, which may result in improved beam selection and refinement (e.g., in low SNR conditions) and improved communications reliability and efficiency. Additionally or alternatively, the second quantity of measurement occasions may be a threshold (e.g., maximum) quantity of measurement occasions.

In some examples, the UE 115-*a* may calculate the quantity of measurement occasions based on the channel conditions (e.g., the SNR), one or more threshold quantities (e.g., the quantity may be between a minimum and maximum configured value), or any combination thereof. That is, the comparison of the channel quality metric to one or more thresholds may additionally or alternatively refer to calculating or otherwise obtaining the quantity of measurement occasions from a function or table having the channel quality metric as an input. For example, the UE 115-*a* may calculate the quantity as a result of an equation with inputs of SNR or other channel metrics, as described herein with reference to FIG. 4, although other techniques are possible.

In some cases, the UE 115-*a* may receive sensor information from a sensor at the UE 115-*a* and may select the second quantity of measurement occasions based on the sensor information. For example, the UE 115-*a* may receive sensor information associated with the mobility of the UE 115-*a*. As an illustrative example, the UE 115-*a* may receive sensor information associated with a lack of mobility (e.g., the UE 115-*a* may be stationary) and the UE 115-*a* may select a second quantity of measurement occasions associated with a threshold (e.g., minimum) quantity of one measurement occasions. Such techniques may enable the UE 115-*a* to realize reduced power consumption by using the threshold quantity of measurement occasions while maintaining relatively good beam selection/refinement (e.g., the previous beam pair and associated channel may be unlikely to experience reduced channel quality due to the UE 115-*a* being relatively stationary).

Figure 3:
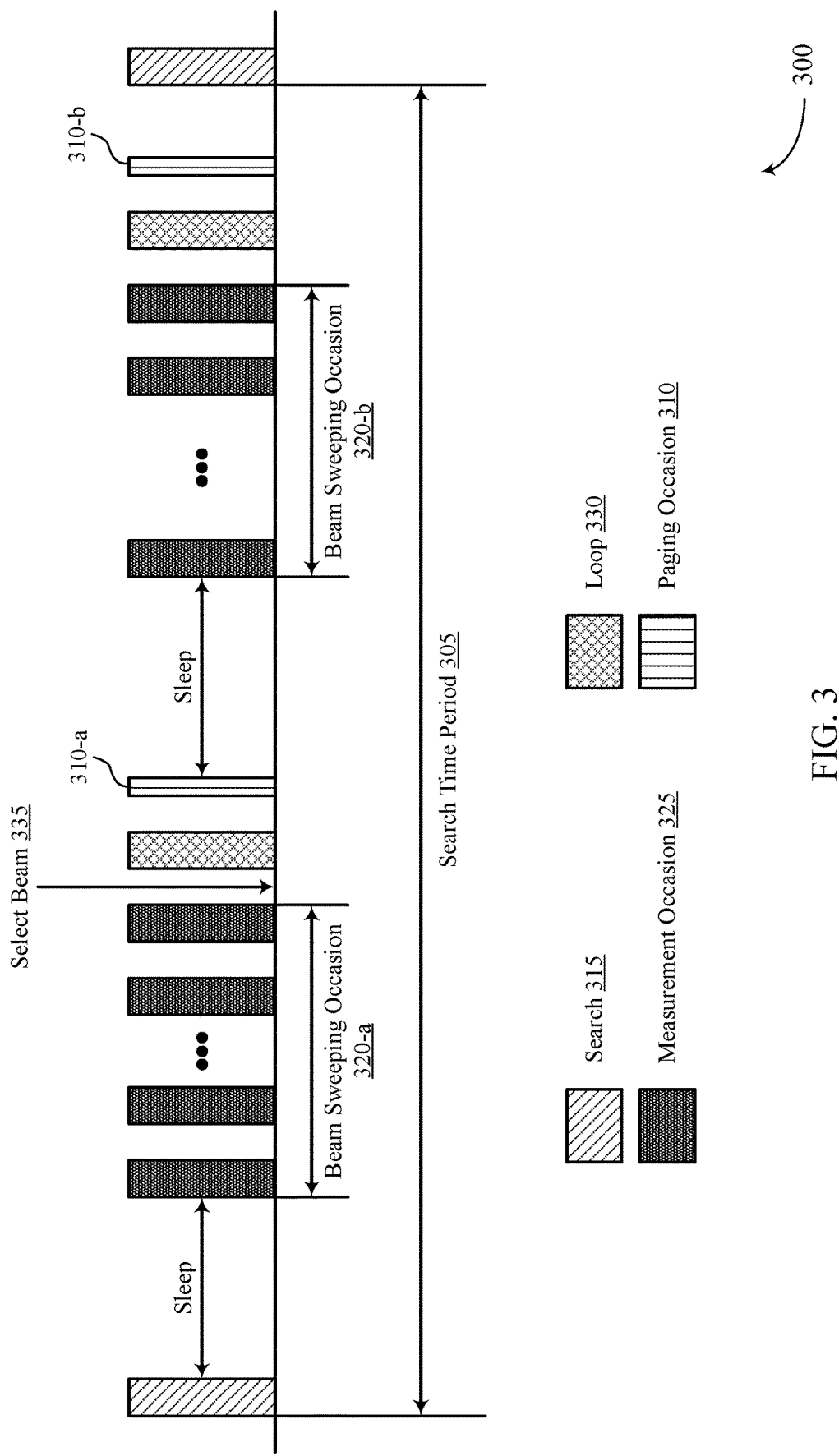
FIG. 3 illustrates an example of a paging procedure that supports techniques for adaptive scheduling in idle mode in accordance with aspects of the present disclosure.

FIG. 3 illustrates an example of a paging procedure 300 that supports techniques for adaptive scheduling in idle mode in accordance with aspects of the present disclosure. In some examples, paging procedure may implement aspects of wireless communications system 100, wireless communications system 200, and may be performed by a UE 115 and a network device 105 as described above with reference to FIG. 1.

In some examples, the UE 115 may operate in an idle mode (e.g., to save power if no data is currently being communicated) and may enter the search time period 305 during the idle mode operation to continue to monitor for pages, which may indicate the network device has data for the UE 115. In some cases, a network device 105 may transmit control signaling to a UE 115 indicating a configuration for a search time period 305 associated with the paging procedure 300. The configuration may include an indication of a first beam sweeping occasion 320-*a* within the search time period 305 and a first paging occasion 310 within the search time period 305. At the beginning of the search time period 305, the UE 115 may perform a search 315 in which the UE 115 may detect a new cell (e.g., in addition or alternative to one or more new SSBs associated with the beam sweeping occasions 320). Stated alternatively, the search 315 occasion may initiate the search time period 305 and enable the UE 115 to detect a new cell and SSB.

In some examples, the UE 115 may sleep for one or more portions of the search time period 305, such as following the search 315, a paging occasion 310, or both, among other examples. During sleep, the UE 115 may refrain from receiving or transmitting communications with the network device 105. In the example of the paging procedure 300, after sleeping for a period of time, the UE 115 may perform a beam sweeping procedure during the beam sweeping occasion 320-*a*. For example, the UE 115 may perform measurements for one or more beams during a first quantity of measurement occasions 325 in the respective beam sweeping occasion 320-*a*. The first quantity of measurement occasions 325 in the beam sweeping occasion 320-*a* may be associated with an initial (e.g., default) quantity of measurement occasions (e.g., signaled by the network device 105, for example, as part of the configuration of the search time period 305). For example, since the beam sweeping occasion 320-*a* is the first beam sweeping occasion 320-*a* in the search time period 305, the UE 115 may be unable to use a metric of a previous beam for selection of the quantity of measurement occasions 325 in the beam sweeping occasion 320-*a*, and thus the UE 115 may use a default, pre-configured, or signaled value for the first quantity of measurement occasions 325.

The UE 115 may measure multiple channel quality metrics of a set of beams associated with the first quantity of measurement occasions 325. The UE 115 may select a first beam at 335 to monitor for a paging message at the paging occasion 310-*a* based on the multiple channel quality metrics. In other words, the UE 115 may perform a beam selection procedure (e.g., an autonomous beam refinement procedure) using the measurements from the first quantity of measurement occasions 325. In some examples, the UE 115 may perform a loop 330 on the selected beam prior to the first paging occasion 310-*a* (e.g., the loop 330 may be scheduled prior to the first paging occasion 310-*a*). The loop 330 may include an FTL and a TTL as described herein. The UE 115 may monitor for a first paging message using the selected beam during the first paging occasion 310-*a*. In some examples, the UE 115 may decode the first paging message based on receiving the first paging message via the selected beam. In some other cases, the network device 105 may not have data for the UE 115 and thus no paging message may be sent during the paging occasion 310-*a*. In some examples, the search time period 305, the beam sweeping occasion 320-*a*, and the loop 330 may be associated with a sync-signal burst set (SSBS) while the paging message associated with the paging occasions 310 may not be associated with a SSBS (e.g., depending on a paging pattern, the page of the paging occasion 310-*a* may not be aligned with the SSBS).

In some examples, the UE 115 may adaptively adjust the quantity of measurement occasions 325 in the beam sweeping occasion 320-*b* based on the selected beam. In some examples, the quantity of measurement occasions 325 may refer to the quantity of measurement occasions 325 that the UE 115 will monitor and measure (e.g., the network device 105 may send a fixed or configured quantity of reference signals but the UE 115 may adaptively refrain from utilizing a portion of the reference signals in some of the measurement occasions 325). For example, the UE 115 may measure the selected beam at 335 to obtain a channel quality metric (e.g., SNR, RSRP, or other metrics associated with the selected beam 335). The UE 115 may compare the channel quality metric to one or more thresholds as described herein. The UE 115 may select a second quantity of measurement occasions 325 for the beam sweeping occasion 320-*b* associated with a second paging occasion 310-*b* based on the comparison.

For example, the channel quality metric may be greater than a threshold and the UE 115 may select the second quantity of measurement occasions 325 such that the second quantity of measurement occasions 325 is less than the first quantity of measurement occasions 325. In another example, the channel quality metric may be less than a threshold and the UE 115 may select the second quantity of measurement occasions 325 such that the second quantity of measurement occasions 325 is greater than the initial quantity of measurement occasions 325. The UE 115 may perform beam selection and/or refinement using the second quantity of measurement occasions 325 during the beam sweeping occasion 320-*b* to select a second beam to monitor for a second paging message associated with the second paging occasion 310-*b*.

Although shown with two paging occasions 310 and two beam sweeping occasions 320-*b* for illustrative clarity, it is to be understood that any quantity or orientation of the elements in FIG. 3 may be used. For example, the techniques described herein may be iterated for any number of search time periods 305 and/or beam sweeping occasions 320 (e.g., a third beam sweeping occasion 320 may have a quantity of measurement occasions 325 based on a metric of the beam selected for the paging occasion 310-*b*, and so on). Additionally or alternatively, other signaling and occasions may be introduced or removed.

In some cases, the paging occasions 310 may be associated with a respective message index (e.g., page index). For example, the first paging occasion 310-*a* may be associated with a message index of n and the second paging occasion 310-*b* may be associated with a message index of n+1. As such, the quantity of measurement occasions 325 associated with each beam sweeping occasion 320 may be based on the message index. For example, the first quantity of measurement occasions 325 may be associated with a quantity $X_{ABR}(n)$ and the second quantity of measurement occasions 325 may be associated with a quantity $X_{ABR}(n+1)$.

In some cases, the quantity of measurement occasions 325 may be spaced such that the last measurement occasion 325 prior to performing the loop 330 may be associated with a value k. Each preceding measurement occasion 325 in a beam sweeping occasion may be associated with a modified value of k. For example, a last measurement occasion 325 may be associated with the value k and the measurement occasion 325 immediately preceding the last measurement occasion 325 may be associated with a value k−1. In accordance with the techniques described herein, the value of k for each beam sweeping occasion 320 may be variable, for example, based on channel conditions, which may result in improved power consumption or communications reliability.

Figure 4:
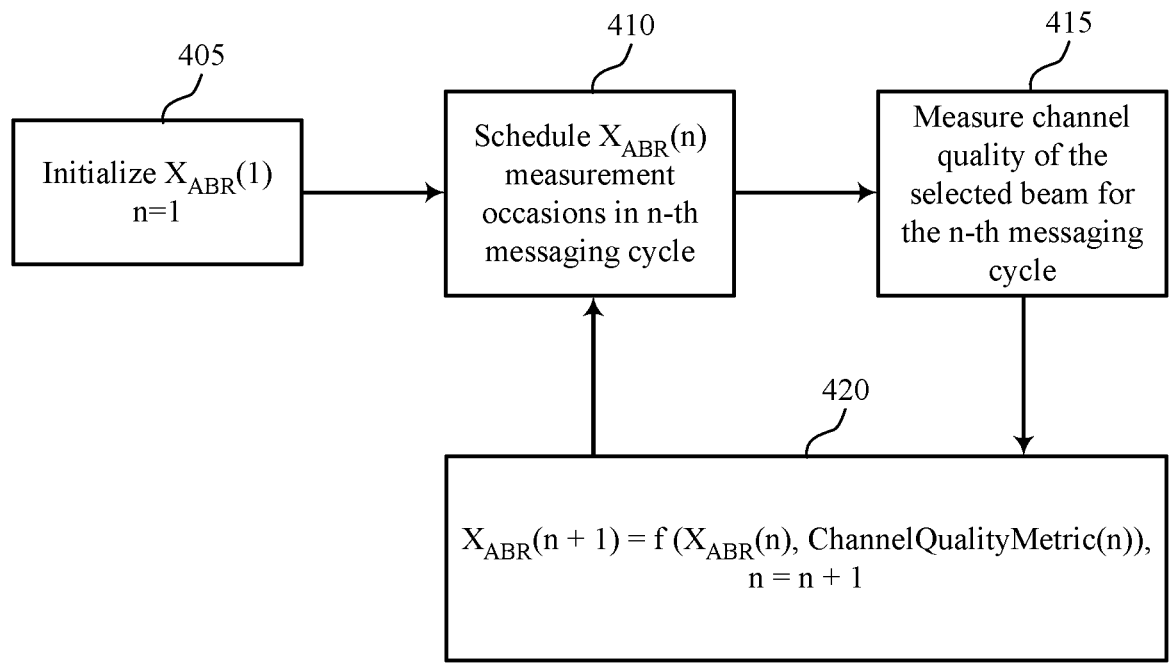
FIG. 4 illustrates an example of an adaptive schedule process that supports techniques for adaptive scheduling in idle mode in accordance with aspects of the present disclosure.

FIG. 4 illustrates an example of an adaptive scheduling process 400 that supports techniques for adaptive scheduling in idle mode in accordance with aspects of the present disclosure. In some examples, the adaptive scheduling process 400 may implement aspects of wireless communications system 100, wireless communications system 200, paging procedure 300, and may be performed by a UE 115 as described above with reference to FIG. 1.

In some cases, at 405 a UE 115 may initialize a quantity of measurement occasions, $X_{ABR}(n)$, to measure in a beam sweeping occasion associated with a paging occasion with a message index, n. For example, the UE 115 may select a first quantity of measurement occasions, $X_{ABR}(1)$, in a first beam sweeping occasion associated with a first paging occasion with a message index, n=1. At 410, the UE 115 may schedule a quantity of measurement occasions in the $n^{th}$ paging cycle. For example, the UE 115 may schedule $X_{ABR}(1)$ measurement occasions in the $1^{st}$ paging cycle (e.g., the UE 115 may select a first or second quantity of measurement occasions as described herein).

At 415, the UE 115 may measure the channel quality of the selected beam for the $n^{th}$ paging cycle. Stated alternatively, for a present paging cycle (e.g., a next upcoming paging occasion), the UE 115 may obtain a metric (e.g., SNR, RSRP, and the like) associated with a beam selected for a previous beam sweeping occasion. At 420, the UE 115 may select a quantity of measurement occasions for the next paging cycle (e.g., n+1 paging cycle) based on the measured channel quality metric as described herein. As an illustrative example, the quantity of measurement occasions may be selected or calculated according to Equation 1:

$$X_{ABR}(n+1)=f(X_{ABR}(n), \text{ChannelQualityMetric}(n)),$$
$$n=n+1 \quad (1)$$

As an illustrative example, the UE 115 may measure the SNR (or any other metric may be used) of the selected beam. As such, the quantity of measurement occasions for the next paging cycle may be output as $f(X_{ABR}(n),SNR(n))$, which may be an example of an SNR dependent function. As an illustrative example, the UE 115 may measure a large SNR and the UE 115 may decrease $X_{ABR}(n)$ to get $X_{ABR}(n+1)$ (e.g., for a large SNR that exceeds a threshold). In another example, the UE 15 may measure a small SNR and the UE 115 may increase $X_{ABR}(n)$ to get $X_{ABR}(n+1)$ (e.g., until reaching a minimum number of measurement occasions to observe, such as a single measurement occasion, or until reaching a maximum number of measurement occasions to observe).

In another illustrative example, the UE 115 may measure the SNR of the selected beam and compare the SNR to a threshold to determine the quantity of measurement occasions for the next paging (e.g., to support a pathloss versus block error rate tradeoff). In some cases, the SNR may be less than a threshold (e.g., −4 dB) and the UE 115 may determine the quantity of measurement occasions for the next paging cycle, f(X,SNR), according to Equation 2:

$$f(X,SNR)=\min(2X,63) \quad (2)$$

In some other cases, the SNR may be greater than or equal to the threshold and the UE 115 may determine the quantity of measurement occasions for the next paging cycle, f(X, SNR), according to Equation 3:

$$f(X, SNR) = \max\left(\text{floor}\left(\frac{X}{1+\frac{X}{64}}\right), 1\right) \quad (3)$$

In some cases, the UE 115 may receive sensor information from a sensor at the UE 115 and may use the sensor information to select $X_{ABR}(n)$. For example, the UE 115 may receive sensor information associated with a lack of mobility (e.g., the UE 115 may be stationary) and $X_{ABR}(n)$ may be associated with a minimum value (e.g., 1).

Figure 5:
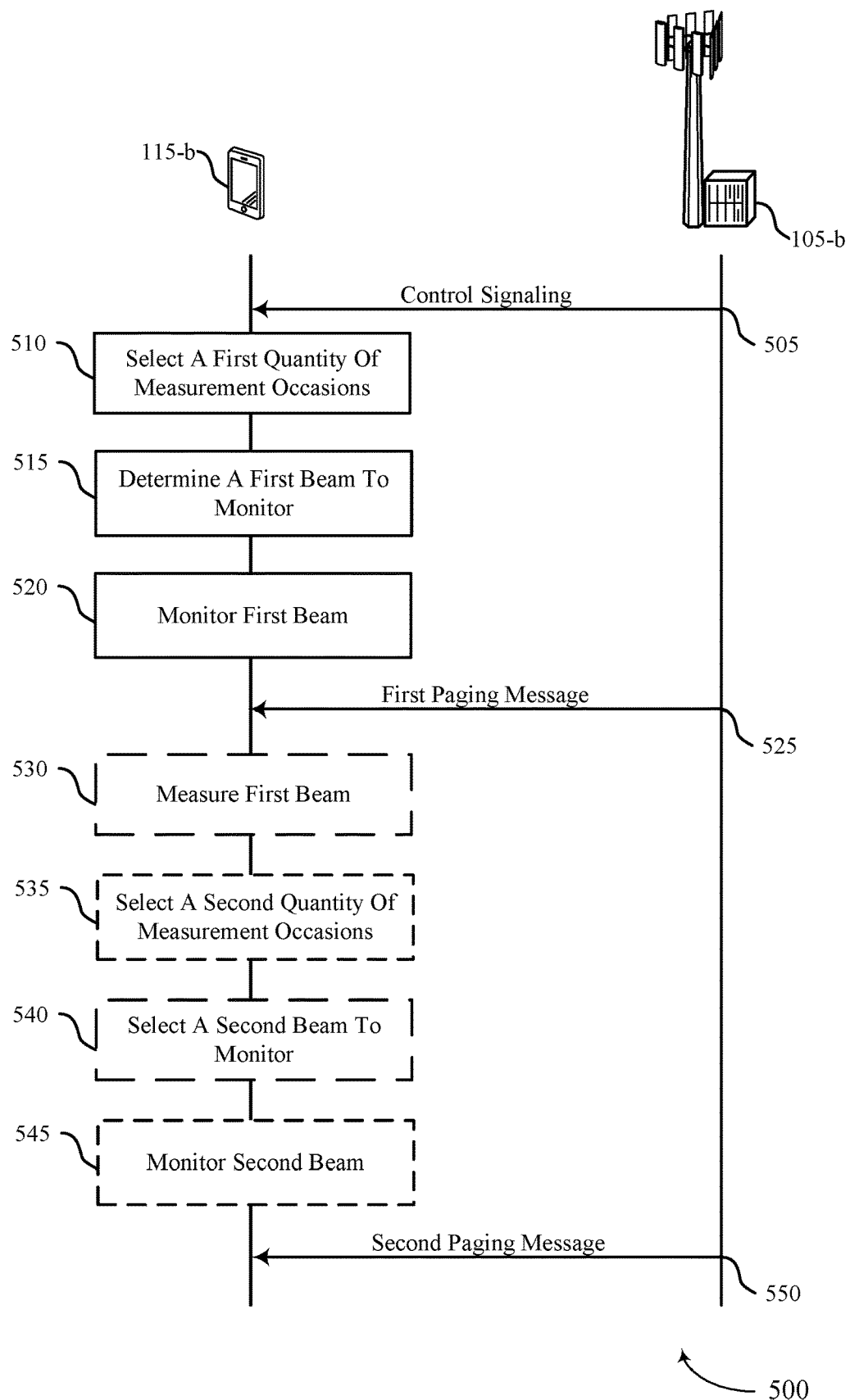
FIG. 5 illustrates an example of a process flow that supports techniques for adaptive scheduling in idle mode in accordance with aspects of the present disclosure.

FIG. 5 illustrates an example of process flow 500 that supports techniques for adaptive scheduling in idle mode in accordance with aspects of the present disclosure. In some examples, process flow 500 may implement aspects of wireless communications system 100, wireless communications system 200, paging procedure 300, and adaptive scheduling process 400 and may include a UE 115-b and a network device 105-b, which may be examples of a UE 115 and a network device 105 and may communicate with one another as described above with reference to FIG. 1.

At 505, the network device 105-b may transmit, to the UE 115-b, control signaling indicating a first beam sweeping occasion, associated with one or more SSBs, within a search time period and a first paging occasion within the search time period. Further, the control signaling may indicate a second beam sweeping occasion within the search time period and a second paging occasion within the search time period. In some cases, the network device 105-b may transmit the control signaling indicating an initial quantity of measurement for the time period associated with the paging procedure. Additionally, the UE 115-b may operate in an idle mode.

At 510, the UE 115-b may select a first quantity of measurement occasions of the first beam sweeping occasion based on a channel quality metric. For example, the channel quality metric may include an SNR. In some cases, the UE 115-a may measure a previous beam associated with a previous message to obtain the channel quality metric, where the previous message occurs prior to the first beam sweeping occasion. In some cases, the first quantity of measurement occasions may be based on the initial quantity of measurement occasions signaled by the network device 105-b.

In some cases, the UE 115-b may select a first value for the first quantity of measurement occasions associated with a first power consumption of the UE 115-b based on a first value of the channel quality metric. In some other cases, the UE 115-b may select a second value for the first quantity of measurement occasions associated with a second power consumption of the UE 115-b based on a second value of the channel quality metric. In some cases, the UE 115-b may compare the channel quality metric to one or more thresholds to select the first quantity of measurement occasions.

In some cases, the UE 115-b may receive sensor information from a sensor at the UE 115-b and may use the sensor information to select the first quantity of measurement occasions.

At 515, the UE 115-b may select a first beam to monitor for a first paging message associated with the first paging occasion using the first quantity of measurement occasions. For example, the UE 115-b may measure multiple beams during the first beam sweeping occasion based on the first quantity of measurement occasions to determine respective channel quality metrics for each beam. The UE 115-b may select the first beam based on the respective channel quality metrics. For example, the UE 115-b may select the first beam based on a first channel quality metric associated with the greatest SNR of the multiple beams.

At 520, the UE 115-b may monitor for the first paging message during the first paging occasion using the first beam.

At 525, the network device 105-b may transmit the first paging message associated with the first paging occasion and the UE 115-b may receive and decode the first paging message.

At 530, the UE 115-*b* may measure the first beam to obtain a second channel quality metric.

At 535, the UE 115-*b* may select a second quantity of measurement occasions for a second beam sweeping occasion associated with a second paging occasion based on the second channel quality metric. For example, the UE 115-*b* may compare the second channel quality metric to the one or more thresholds.

At 540, the UE 115-*b* may select a second beam to monitor during a second beam sweeping occasion associated with the second paging occasion using the second quantity of measurement occasions.

At 545, the UE 115-*b* may monitor for the second paging message during the second paging occasion using the second beam and, at 550, may receive the second paging message from the network device 105-*b*.

In some examples, the techniques described herein may result in reduced power consumption or improved communications reliability at the UE 115-*b* as described with reference to FIGS. 1-5. As an illustrative example, the network device 105-*b* may transmit the first paging messaging with a first transmit power, resulting in the first value of the channel quality metric (e.g., the channel quality metric for the beam pair when the network device 105-*b* uses the first transmit power may be associated with a first power consumption of the UE 115-*b* due to a corresponding selected quantity of measurement occasions). Additionally or alternatively, the network device 105-*b* may transmit a paging message with a second transmit power, resulting in a second channel quality metric associated with a second power consumption of the UE 115-*b*. That is, the UE 115-*b* may consume different amounts of power by using different quantities of measurement occasions in accordance with a channel quality (e.g., the lower transmit power may result in a lower channel quality metric and thus higher power consumption at the UE 115-*b*, whereas the higher transmit power may result in a higher channel quality metric and thus lower power consumption at the UE 115-*b*).

Figure 6:
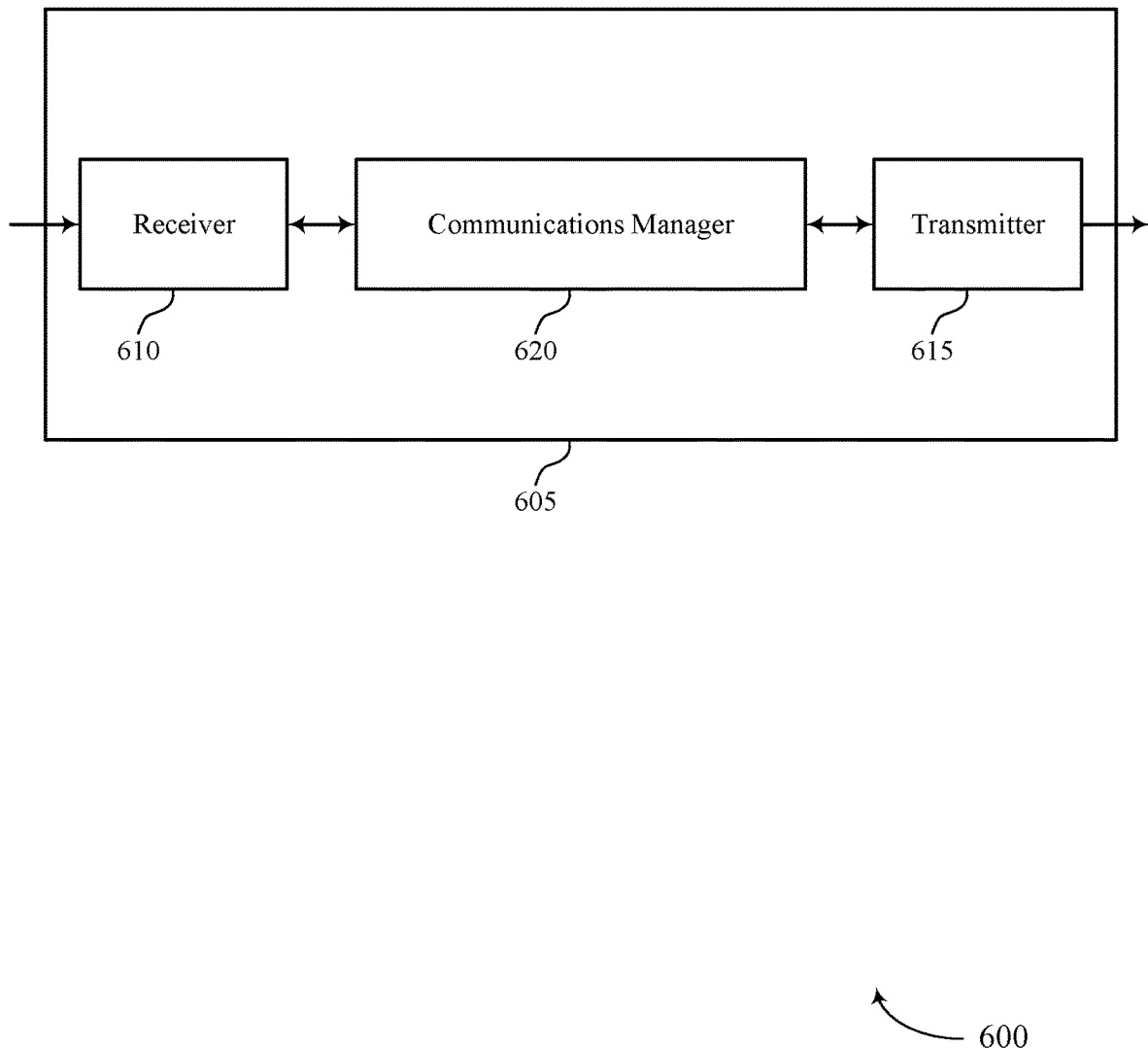
FIGS. 6 and 7 show diagrams of devices that support techniques for adaptive scheduling in idle mode in accordance with aspects of the present disclosure.

FIG. 6 shows a diagram 600 of a device 605 that supports techniques for adaptive scheduling in idle mode in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for adaptive scheduling in idle mode). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for adaptive scheduling in idle mode). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of techniques for adaptive scheduling in idle mode as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. For example, the communications manager 620 may be configured as or otherwise support a means for receiving control signaling indicating a first beam sweeping occasion within a search time period and a first paging occasion within the search time period. The communications manager 620 may be configured as or otherwise support a means for selecting a first quantity of measurement occasions of the first beam sweeping occasion for monitoring of a first set of multiple beams based on a channel quality metric observed for a prior beam during a prior beam sweeping occasion. The communications manager 620 may be configured as or otherwise support a means for selecting a first beam of the first set of multiple beams to monitor for a first paging message during the first paging occasion based on a first set of multiple channel quality metrics observed for the first set of multiple beams during the first quantity of measurement occasions. The communications manager 620 may be configured as or otherwise support a means for monitoring for the first paging message during the first paging occasion using the first beam.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for adaptively selecting a quantity of measurement occasions for a beam sweeping occasion associated with a paging occasion which may result in reduced processing, reduced power consumption, and more efficient utilization of communication resources.

Figure 7:
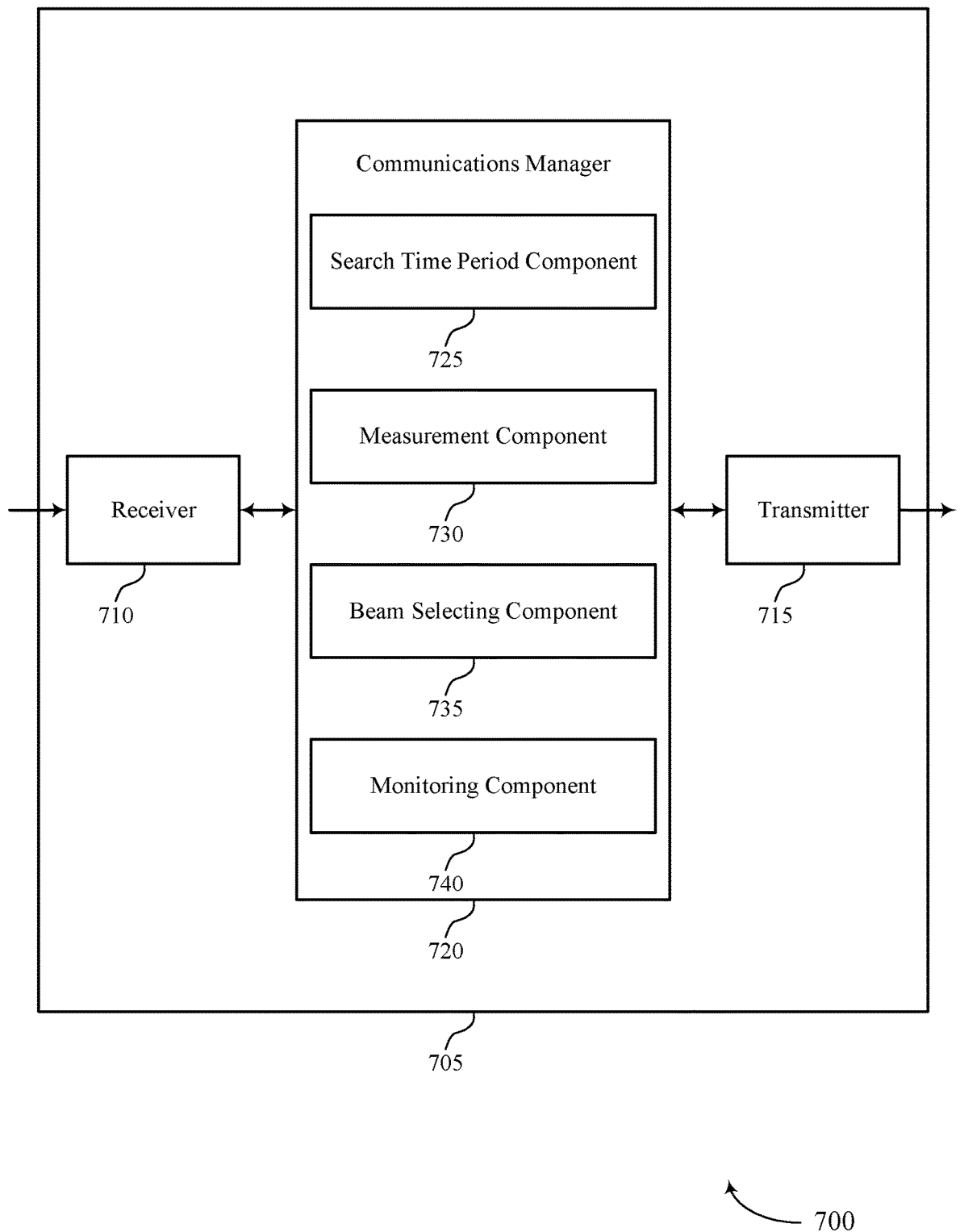

FIG. 7 shows a diagram 700 of a device 705 that supports techniques for adaptive scheduling in idle mode in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for adaptive scheduling in idle mode). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for adaptive scheduling in idle mode). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of techniques for adaptive scheduling in idle mode as described herein. For example, the communications manager 720 may include a search time period component 725, a measurement component 730, a beam selecting component 735, a monitoring component 740, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a UE in accordance with examples as disclosed herein. The search time period component 725 may be configured as or otherwise support a means for receiving control signaling indicating a first beam sweeping occasion within a search time period and a first paging occasion within the search time period. The measurement component 730 may be configured as or otherwise support a means for selecting a first quantity of measurement occasions of the first beam sweeping occasion for monitoring of a first set of multiple beams based on a channel quality metric observed for a prior beam during a prior beam sweeping occasion. The beam selecting component 735 may be configured as or otherwise support a means for selecting a first beam of the first set of multiple beams to monitor for a first paging message during the first paging occasion based on a first set of multiple channel quality metrics observed for the first set of multiple beams during the first quantity of measurement occasions. The monitoring component 740 may be configured as or otherwise support a means for monitoring for the first paging message during the first paging occasion using the first beam.

Figure 8:
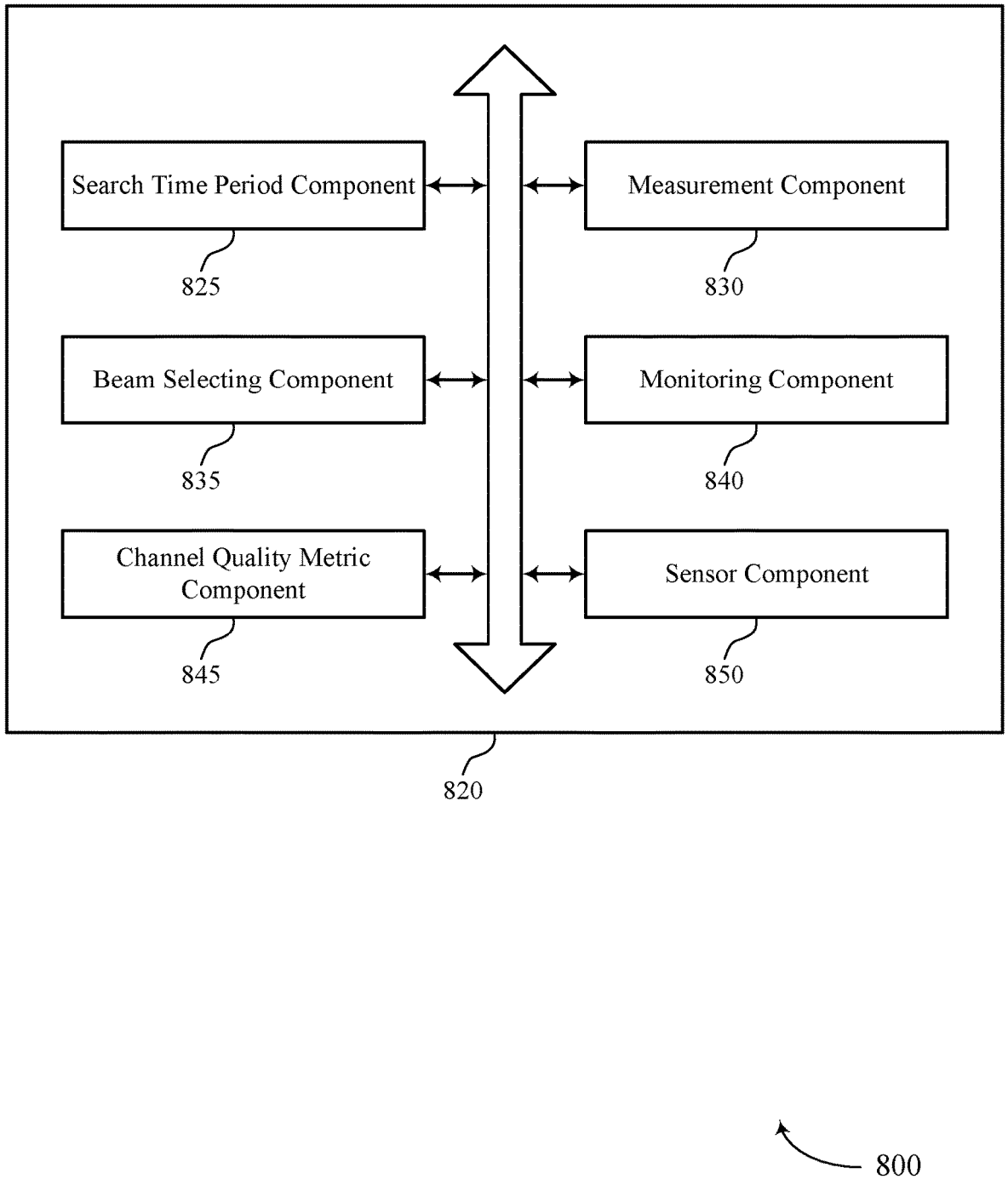
FIG. 8 shows a diagram of a communications manager that supports techniques for adaptive scheduling in idle mode in accordance with aspects of the present disclosure.

FIG. 8 shows a diagram 800 of a communications manager 820 that supports techniques for adaptive scheduling in idle mode in accordance with aspects of the present disclosure. The communications manager 820 may be an example of aspects of a communications manager 620, a communications manager 720, or both, as described herein. The communications manager 820, or various components thereof, may be an example of means for performing various aspects of techniques for adaptive scheduling in idle mode as described herein. For example, the communications manager 820 may include a search time period component 825, a measurement component 830, a beam selecting component 835, a monitoring component 840, a channel quality metric component 845, a sensor component 850, or any combination thereof. Each of these components may communicate, directly or indirectly, with one another (e.g., via one or more buses).

The communications manager 820 may support wireless communications at a UE in accordance with examples as disclosed herein. The search time period component 825 may be configured as or otherwise support a means for receiving control signaling indicating a first beam sweeping occasion within a search time period and a first paging occasion within the search time period. The measurement component 830 may be configured as or otherwise support a means for selecting a first quantity of measurement occasions of the first beam sweeping occasion for monitoring of a first set of multiple beams based on a channel quality metric observed for a prior beam during a prior beam sweeping occasion. The beam selecting component 835 may be configured as or otherwise support a means for selecting a first beam of the first set of multiple beams to monitor for a first paging message during the first paging occasion based on a first set of multiple channel quality metrics observed for the first set of multiple beams during the first quantity of measurement occasions. The monitoring component 840 may be configured as or otherwise support a means for monitoring for the first paging message during the first paging occasion using the first beam.

In some examples, the search time period component 825 may be configured as or otherwise support a means for receiving the control signaling indicating a second beam sweeping occasion within the search time period and a second paging occasion within the search time period. In some examples, the measurement component 830 may be configured as or otherwise support a means for selecting a second quantity of measurement occasions of the second beam sweeping occasion for monitoring of a second set of multiple beams based on the channel quality metric observed for the first beam during the first beam sweeping occasion. In some examples, the beam selecting component 835 may be configured as or otherwise support a means for selecting a second beam of the second set of multiple beams to monitor for a second paging message during the second paging occasion based on a second set of multiple channel quality metrics observed for the second set of multiple beams during the second quantity of measurement occasions. In some examples, the monitoring component 840 may be configured as or otherwise support a means for monitoring for the second paging message during the second paging occasion using the second beam.

In some examples, the channel quality metric component 845 may be configured as or otherwise support a means for comparing the channel quality metric observed for the first beam during the first beam sweeping occasion to one or more thresholds, where selecting the second quantity of measurement occasions is based on the comparison.

In some examples, to support selecting the first quantity of measurement occasions, the measurement component 830 may be configured as or otherwise support a means for selecting a first value for the first quantity of measurement occasions in accordance with a first value of the channel quality metric observed for the prior beam during the prior beam sweeping occasion. In some examples, to support selecting the first quantity of measurement occasions, the measurement component 830 may be configured as or otherwise support a means for selecting a second value for the first quantity of measurement occasions in accordance with a second value of the channel quality metric observed for the prior beam during the prior beam sweeping occasion.

In some examples, the measurement component 830 may be configured as or otherwise support a means for determining an initial quantity of measurement occasions for the search time period based on receiving the control signaling.

In some examples, the channel quality metric component 845 may be configured as or otherwise support a means for measuring the prior beam associated with the prior beam sweeping occasion to obtain the channel quality metric, where the prior beam is further associated with a previous paging message.

In some examples, the channel quality metric component 845 may be configured as or otherwise support a means for comparing the channel quality metric observed for the prior beam during the prior beam sweeping occasion to one or more thresholds, where selecting the first quantity of measurement occasions is based on the comparison.

In some examples, the sensor component 850 may be configured as or otherwise support a means for receiving sensor information from a sensor at the UE, where selecting the first quantity of measurement occasions is based on the sensor information.

In some examples, the search time period component 825 may be configured as or otherwise support a means for operating in an idle mode, where monitoring for the first paging message is based on operating in the idle mode.

In some examples, the first beam sweeping occasion is associated with one or more synchronization signal blocks.

In some examples, the channel quality metric includes a signal-to-noise ratio (SNR), a reference signal received power (RSRP), or both.

In some examples, a first value for the first quantity of measurement occasions is associated with a first power consumption of the UE, and a second value for the first quantity of measurement occasions is associated with a second power consumption of the UE.

Figure 9:
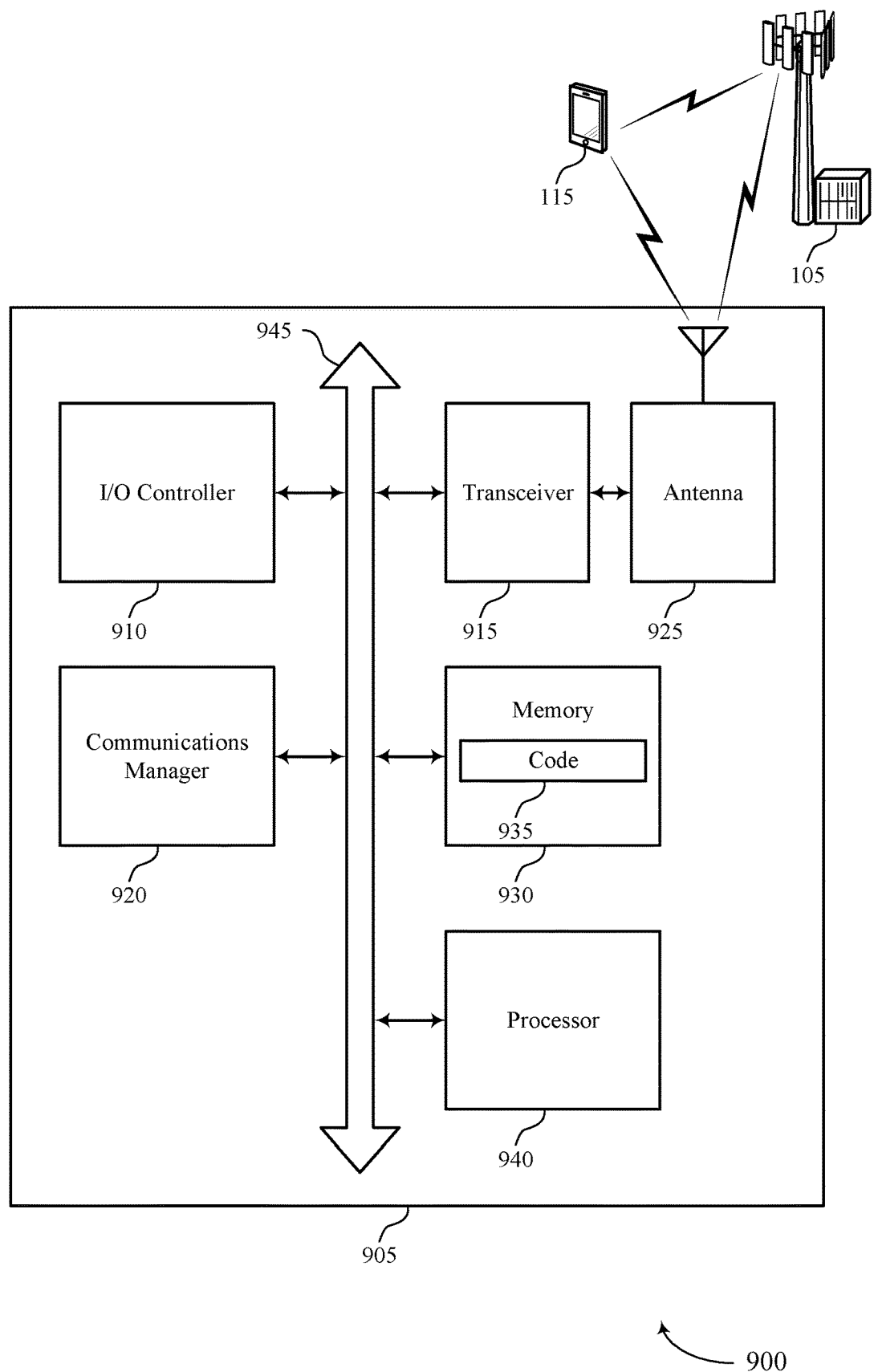
FIG. 9 shows a diagram of a system including a device that supports techniques for adaptive scheduling in idle mode in accordance with aspects of the present disclosure.

FIG. 9 shows a diagram of a system 900 including a device 905 that supports techniques for adaptive scheduling in idle mode in accordance with aspects of the present disclosure. The device 905 may be an example of or include the components of a device 605, a device 705, or a UE 115 as described herein. The device 905 may communicate wirelessly with one or more network devices 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for adaptive scheduling in idle mode). For example, the device 905 or a component of the device 905 may include a processor 940 and memory 930 coupled with or to the processor 940, the processor 940 and memory 930 configured to perform various functions described herein.

The communications manager 920 may support wireless communications at a UE in accordance with examples as disclosed herein. For example, the communications manager 920 may be configured as or otherwise support a means for receiving control signaling indicating a first beam sweeping occasion within a search time period and a first paging occasion within the search time period. The communications manager 920 may be configured as or otherwise support a means for selecting a first quantity of measurement occasions of the first beam sweeping occasion for monitoring of a first set of multiple beams based on a channel quality metric observed for a prior beam during a prior beam sweeping occasion. The communications manager 920 may be configured as or otherwise support a means for selecting a first beam of the first set of multiple beams to monitor for a first paging message during the first paging occasion based on a first set of multiple channel quality metrics observed for the first set of multiple beams during the first quantity of measurement occasions. The communications manager 920 may be configured as or otherwise support a means for monitoring for the first paging message during the first paging occasion using the first beam.

By including or configuring the communications manager 920 in accordance with examples as described herein, the device 905 may support techniques for adaptively selecting a quantity of measurement occasions for a beam sweeping occasion associated with a paging occasion which may result in improved communication reliability, reduced latency, improved user experience related to reduced processing, reduced power consumption, more efficient utilization of communication resources, improved coordination between devices, longer battery life, and improved utilization of processing capability.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for adaptive scheduling in idle mode as described herein, or the processor 940 and the memory 930 may be otherwise configured to perform or support such operations.

Figure 10:
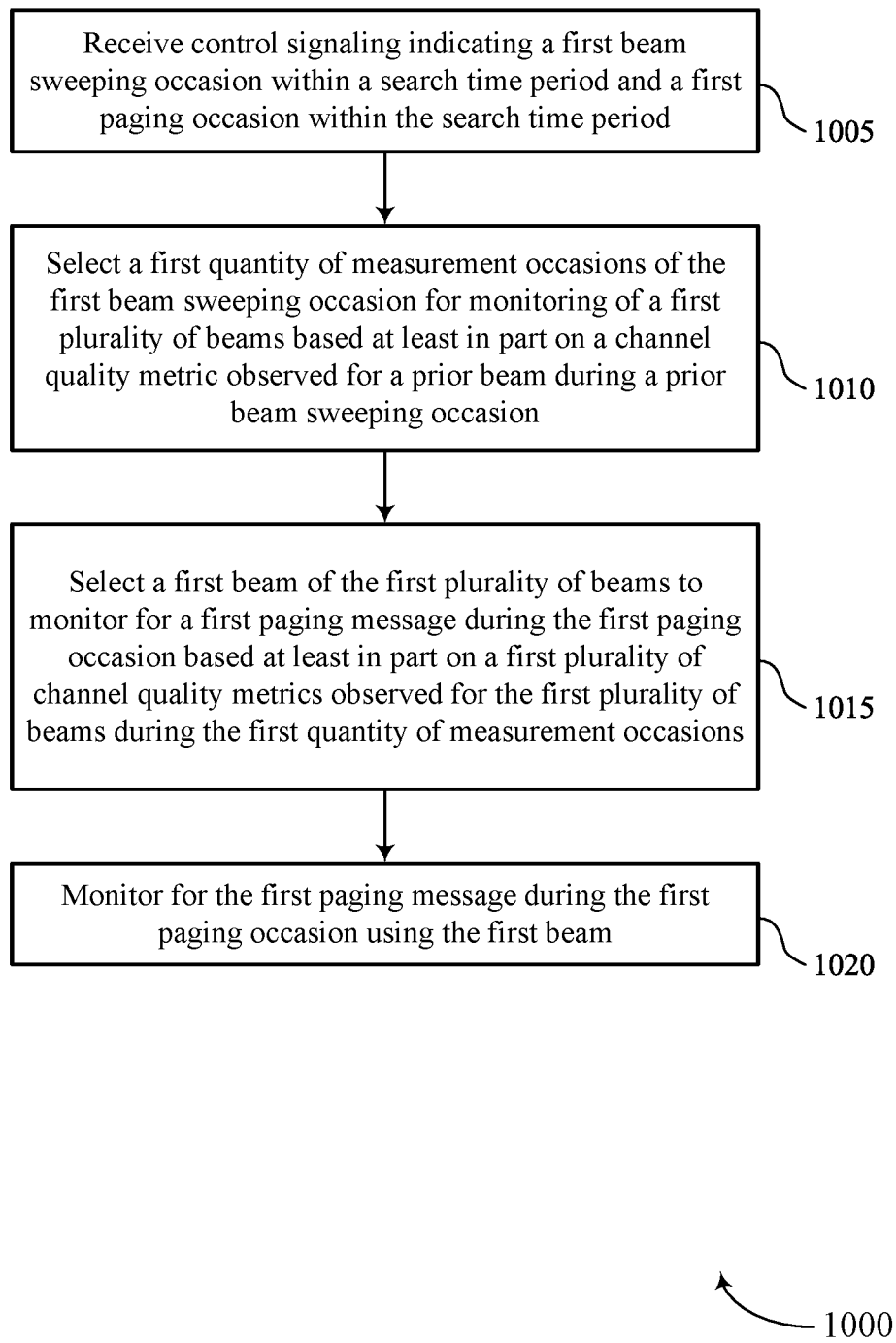
FIGS. 10 and 11 show flowcharts illustrating methods that support techniques for adaptive scheduling in idle mode in accordance with aspects of the present disclosure.

FIG. 10 shows a flowchart illustrating a method 1000 that supports techniques for adaptive scheduling in idle mode in accordance with aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1005, the method may include receiving control signaling indicating a first beam sweeping occasion within a search time period and a first paging occasion within the search time period. The operations of 1005 may be performed in accordance with examples as disclosed herein. In some examples, aspects of the operations of 1005 may be performed by a search time period component 825 as described with reference to FIG. 8.

At 1010, the method may include selecting a first quantity of measurement occasions of the first beam sweeping occasion for monitoring of a first set of multiple beams based on a channel quality metric observed for a prior beam during a prior beam sweeping occasion. The operations of 1010 may be performed in accordance with examples as disclosed herein. In some examples, aspects of the operations of 1010 may be performed by a measurement component 830 as described with reference to FIG. 8.

At 1015, the method may include selecting a first beam of the first set of multiple beams to monitor for a first paging message during the first paging occasion based on a first set of multiple channel quality metrics observed for the first set of multiple beams during the first quantity of measurement occasions. The operations of 1015 may be performed in accordance with examples as disclosed herein. In some examples, aspects of the operations of 1015 may be performed by a beam selecting component 835 as described with reference to FIG. 8.

At 1020, the method may include monitoring for the first paging message during the first paging occasion using the first beam. The operations of 1020 may be performed in accordance with examples as disclosed herein. In some examples, aspects of the operations of 1020 may be performed by a monitoring component 840 as described with reference to FIG. 8.

Figure 11:
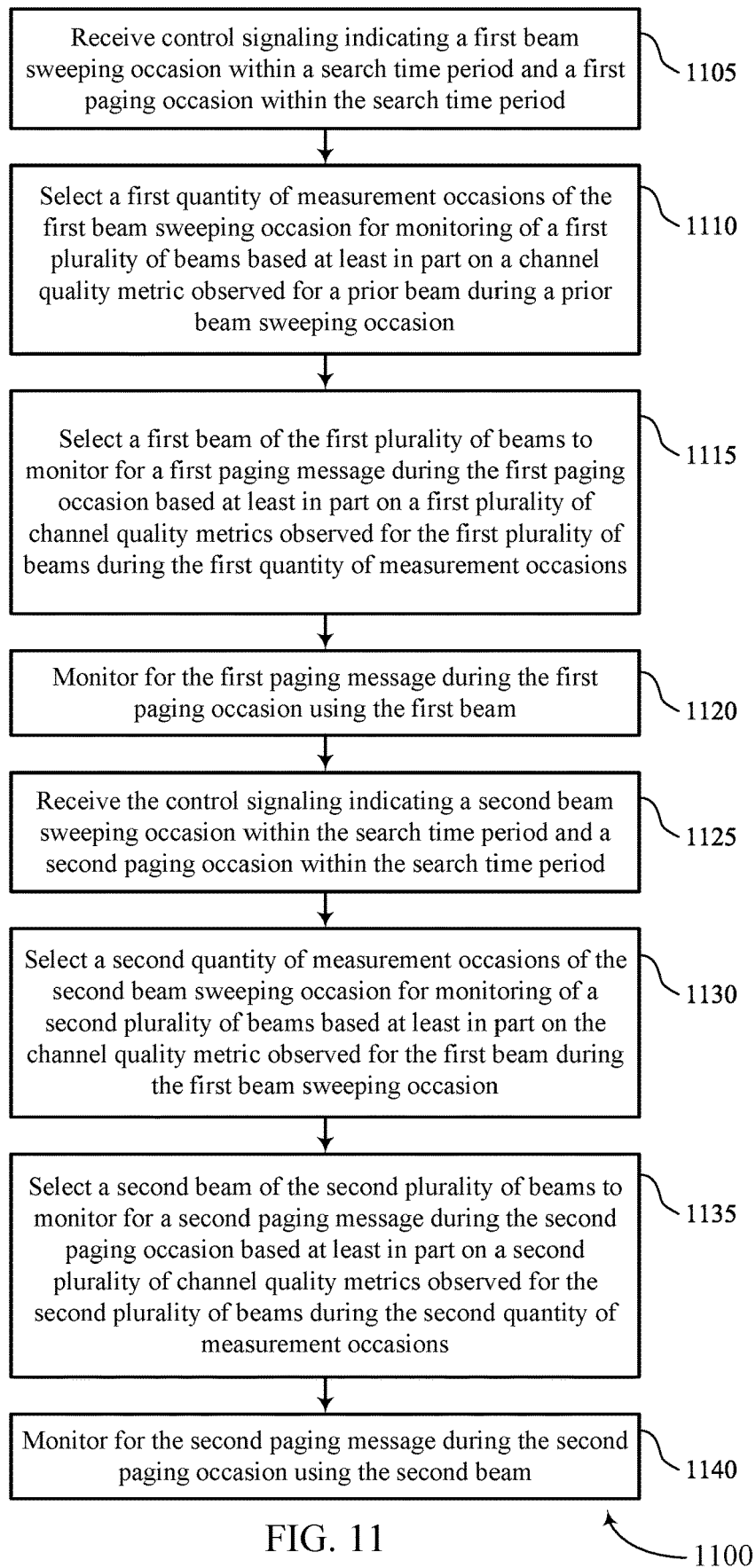

FIG. 11 shows a flowchart illustrating a method 1100 that supports techniques for adaptive scheduling in idle mode in accordance with aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1105, the method may include receiving control signaling indicating a first beam sweeping occasion within a search time period and a first paging occasion within the search time period. The operations of 1105 may be performed in accordance with examples as disclosed herein. In some examples, aspects of the operations of 1105 may be performed by a search time period component 825 as described with reference to FIG. 8.

At 1110, the method may include selecting a first quantity of measurement occasions of the first beam sweeping occasion for monitoring of a first set of multiple beams based on a channel quality metric observed for a prior beam during a prior beam sweeping occasion. The operations of 1110 may be performed in accordance with examples as disclosed herein. In some examples, aspects of the operations of 1110 may be performed by a measurement component 830 as described with reference to FIG. 8.

At 1115, the method may include selecting a first beam of the first set of multiple beams to monitor for a first paging message during the first paging occasion based on a first set of multiple channel quality metrics observed for the first set of multiple beams during the first quantity of measurement occasions. The operations of 1115 may be performed in accordance with examples as disclosed herein. In some examples, aspects of the operations of 1115 may be performed by a beam selecting component 835 as described with reference to FIG. 8.

At 1120, the method may include monitoring for the first paging message during the first paging occasion using the first beam. The operations of 1120 may be performed in accordance with examples as disclosed herein. In some examples, aspects of the operations of 1120 may be performed by a monitoring component 840 as described with reference to FIG. 8.

At 1125, the method may include receiving the control signaling indicating a second beam sweeping occasion within the search time period and a second paging occasion within the search time period. The operations of 1125 may be performed in accordance with examples as disclosed herein. In some examples, aspects of the operations of 1125 may be performed by a search time period component 825 as described with reference to FIG. 8.

At 1130, the method may include selecting a second quantity of measurement occasions of the second beam sweeping occasion for monitoring of a second set of multiple beams based on the channel quality metric observed for the first beam during the first beam sweeping occasion. The operations of 1130 may be performed in accordance with examples as disclosed herein. In some examples, aspects of the operations of 1130 may be performed by a measurement component 830 as described with reference to FIG. 8.

At 1135, the method may include selecting a second beam of the second set of multiple beams to monitor for a second paging message during the second paging occasion based on a second set of multiple channel quality metrics observed for the second set of multiple beams during the second quantity of measurement occasions. The operations of 1135 may be performed in accordance with examples as disclosed herein. In some examples, aspects of the operations of 1135 may be performed by a beam selecting component 835 as described with reference to FIG. 8.

At 1140, the method may include monitoring for the second paging message during the second paging occasion using the second beam. The operations of 1140 may be performed in accordance with examples as disclosed herein. In some examples, aspects of the operations of 1140 may be performed by a monitoring component 840 as described with reference to FIG. 8.

The following provides an overview of aspects of the present disclosure:

Aspect 1: A method for wireless communications at a UE, comprising: receiving control signaling indicating a first beam sweeping occasion within a search time period and a first paging occasion within the search time period; selecting a first quantity of measurement occasions of the first beam sweeping occasion for monitoring of a first plurality of beams based at least in part on a channel quality metric observed for a prior beam during a prior beam sweeping occasion; selecting a first beam of the first plurality of beams to monitor for a first paging message during the first paging occasion based at least in part on a first plurality of channel quality metrics observed for the first plurality of beams during the first quantity of measurement occasions; and monitoring for the first paging message during the first paging occasion using the first beam.

Aspect 2: The method of aspect 1, further comprising: receiving the control signaling indicating a second beam sweeping occasion within the search time period and a second paging occasion within the search time period; selecting a second quantity of measurement occasions of the second beam sweeping occasion for monitoring of a second plurality of beams based at least in part on the channel quality metric observed for the first beam during the first beam sweeping occasion; selecting a second beam of the second plurality of beams to monitor for a second paging message during the second paging occasion based at least in part on a second plurality of channel quality metrics observed for the second plurality of beams during the second quantity of measurement occasions; and monitoring for the second paging message during the second paging occasion using the second beam.

Aspect 3: The method of aspect 2, further comprising: comparing the channel quality metric observed for the first beam during the first beam sweeping occasion to one or more thresholds, wherein selecting the second quantity of measurement occasions is based at least in part on the comparison.

Aspect 4: The method of any of aspects 1 through 3, wherein selecting the first quantity of measurement occasions further comprises: selecting a first value for the first quantity of measurement occasions in accordance with a first value of the channel quality metric observed for the prior beam during the prior beam sweeping occasion; or selecting a second value for the first quantity of measurement occasions in accordance with a second value of the channel quality metric observed for the prior beam during the prior beam sweeping occasion.

Aspect 5: The method of any of aspects 1 through 4, further comprising: determining an initial quantity of measurement occasions for the search time period based at least in part on receiving the control signaling.

Aspect 6: The method of any of aspects 1 through 5, further comprising: measuring the prior beam associated with the prior beam sweeping occasion to obtain the channel quality metric, wherein the prior beam is further associated with a previous paging message.

Aspect 7: The method of any of aspects 1 through 6, further comprising: comparing the channel quality metric observed for the prior beam during the prior beam sweeping occasion to one or more thresholds, wherein selecting the first quantity of measurement occasions is based at least in part on the comparison.

Aspect 8: The method of any of aspects 1 through 7, further comprising: receiving sensor information from a sensor at the UE, wherein selecting the first quantity of measurement occasions is based at least in part on the sensor information.

Aspect 9: The method of any of aspects 1 through 8, further comprising: operating in an idle mode, wherein monitoring for the first paging message is based at least in part on operating in the idle mode.

Aspect 10: The method of any of aspects 1 through 9, wherein the first beam sweeping occasion is associated with one or more synchronization signal blocks.

Aspect 11: The method of any of aspects 1 through 10, wherein the channel quality metric comprises an SNR, a reference signal received power (RSRP), or both.

Aspect 12: The method of any of aspects 1 through 11, wherein a first value for the first quantity of measurement occasions is associated with a first power consumption of the UE, and a second value for the first quantity of measurement occasions is associated with a second power consumption of the UE.

Aspect 13: An apparatus for wireless communications at a UE, comprising a processor; memory coupled with the processor; and instructions stored in the memory and executable by the processor to cause the apparatus to perform a method of any of aspects 1 through 12.

Aspect 14: An apparatus for wireless communications at a UE, comprising at least one means for performing a method of any of aspects 1 through 12.

Aspect 15: A non-transitory computer-readable medium storing code for wireless communications at a UE, the code comprising instructions executable by a processor to perform a method of any of aspects 1 through 12.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
    receiving control signaling indicating a first beam sweeping occasion within a search time period and a first paging occasion within the search time period;
    selecting a first quantity of measurement occasions of the first beam sweeping occasion for monitoring of a first plurality of beams based at least in part on a channel quality metric observed for a prior beam during a prior beam sweeping occasion, wherein the first quantity of measurement occasions differs from a second quantity of measurement occasions associated with the prior beam sweeping occasion;
    selecting a first beam of the first plurality of beams to monitor for a first paging message during the first paging occasion based at least in part on a first plurality of channel quality metrics observed for the first plurality of beams during the first quantity of measurement occasions; and
    monitoring for the first paging message during the first paging occasion using the first beam.

2. The method of claim 1, further comprising:
    receiving the control signaling indicating a second beam sweeping occasion within the search time period and a second paging occasion within the search time period;
    selecting a third quantity of measurement occasions of the second beam sweeping occasion for monitoring of a second plurality of beams based at least in part on the channel quality metric observed for the first beam during the first beam sweeping occasion;
    selecting a second beam of the second plurality of beams to monitor for a second paging message during the second paging occasion based at least in part on a second plurality of channel quality metrics observed for the second plurality of beams during the third quantity of measurement occasions; and
    monitoring for the second paging message during the second paging occasion using the second beam.

3. The method of claim 2, further comprising:
    comparing the channel quality metric observed for the first beam during the first beam sweeping occasion to one or more thresholds, wherein selecting the third quantity of measurement occasions is based at least in part on the comparison.

4. The method of claim 1, wherein selecting the first quantity of measurement occasions further comprises:
    selecting a first value for the first quantity of measurement occasions in accordance with a first value of the channel quality metric observed for the prior beam during the prior beam sweeping occasion; or
    selecting a second value for the first quantity of measurement occasions in accordance with a second value of the channel quality metric observed for the prior beam during the prior beam sweeping occasion.

5. The method of claim 1, further comprising:
    determining an initial quantity of measurement occasions for the search time period based at least in part on receiving the control signaling.

6. The method of claim 1, further comprising:
    measuring the prior beam associated with the prior beam sweeping occasion to obtain the channel quality metric, wherein the prior beam is further associated with a previous paging message.

7. The method of claim 1, further comprising:
    comparing the channel quality metric observed for the prior beam during the prior beam sweeping occasion to one or more thresholds, wherein selecting the first quantity of measurement occasions is based at least in part on the comparison.

8. The method of claim 1, further comprising:
    receiving sensor information from a sensor at the UE, wherein selecting the first quantity of measurement occasions is based at least in part on the sensor information.

9. The method of claim 1, further comprising:
    operating in an idle mode, wherein monitoring for the first paging message is based at least in part on operating in the idle mode.

10. The method of claim 1, wherein the first beam sweeping occasion is associated with one or more synchronization signal blocks.

11. The method of claim 1, wherein the channel quality metric comprises a signal-to-noise ratio (SNR), a reference signal received power (RSRP), or both.

12. The method of claim 1, wherein a first value for the first quantity of measurement occasions is associated with a first power consumption of the UE, and a second value for the first quantity of measurement occasions is associated with a second power consumption of the UE.

13. An apparatus for wireless communications at a user equipment (UE), comprising:
    at least one processor;
    at least one memory coupled with the at least one processor; and
    instructions stored in the at least one memory and executable by the at least one processor to cause the apparatus to:

receive control signaling indicating a first beam sweeping occasion within a search time period and a first paging occasion within the search time period;

select a first quantity of measurement occasions of the first beam sweeping occasion for monitoring of a first plurality of beams based at least in part on a channel quality metric observed for a prior beam during a prior beam sweeping occasion, wherein the first quantity of measurement occasions differs from a second quantity of measurement occasions associated with the prior beam sweeping occasion;

select a first beam of the first plurality of beams to monitor for a first paging message during the first paging occasion based at least in part on a first plurality of channel quality metrics observed for the first plurality of beams during the first quantity of measurement occasions; and monitor for the first paging message during the first paging occasion using the first beam.

14. The apparatus of claim 13, wherein the instructions are further executable by the at least one processor to cause the apparatus to:

receive the control signaling indicating a second beam sweeping occasion within the search time period and a second paging occasion within the search time period;

select a third quantity of measurement occasions of the second beam sweeping occasion for monitoring of a second plurality of beams based at least in part on the channel quality metric observed for the first beam during the first beam sweeping occasion;

select a second beam of the second plurality of beams to monitor for a second paging message during the second paging occasion based at least in part on a second plurality of channel quality metrics observed for the second plurality of beams during the third quantity of measurement occasions; and monitor for the second paging message during the second paging occasion using the second beam.

15. The apparatus of claim 14, wherein the instructions are further executable by the at least one processor to cause the apparatus to:

compare the channel quality metric observed for the first beam during the first beam sweeping occasion to one or more thresholds, wherein selecting the third quantity of measurement occasions is based at least in part on the comparison.

16. The apparatus of claim 13, wherein the instructions to select the first quantity of measurement occasions are further executable by the at least one processor to cause the apparatus to:

select a first value for the first quantity of measurement occasions in accordance with a first value of the channel quality metric observed for the prior beam during the prior beam sweeping occasion; or select a second value for the first quantity of measurement occasions in accordance with a second value of the channel quality metric observed for the prior beam during the prior beam sweeping occasion.

17. The apparatus of claim 13, wherein the instructions are further executable by the at least one processor to cause the apparatus to:

determine an initial quantity of measurement occasions for the search time period based at least in part on receiving the control signaling.

18. The apparatus of claim 13, wherein the instructions are further executable by the at least one processor to cause the apparatus to:

measure the prior beam associated with the prior beam sweeping occasion to obtain the channel quality metric, wherein the prior beam is further associated with a previous paging message.

19. The apparatus of claim 13, wherein the instructions are further executable by the at least one processor to cause the apparatus to:

compare the channel quality metric observed for the prior beam during the prior beam sweeping occasion to one or more thresholds, wherein selecting the first quantity of measurement occasions is based at least in part on the comparison.

20. The apparatus of claim 13, wherein the instructions are further executable by the at least one processor to cause the apparatus to:

receive sensor information from a sensor at the UE, wherein selecting the first quantity of measurement occasions is based at least in part on the sensor information.

21. The apparatus of claim 13, wherein the instructions are further executable by the at least one processor to cause the apparatus to:

operate in an idle mode, wherein monitoring for the first paging message is based at least in part on operating in the idle mode.

22. The apparatus of claim 13, wherein the first beam sweeping occasion is associated with one or more synchronization signal blocks.

23. The apparatus of claim 13, wherein the channel quality metric comprises a signal-to-noise ratio (SNR), a reference signal received power (RSRP), or both.

24. The apparatus of claim 13, wherein a first value for the first quantity of measurement occasions is associated with a first power consumption of the UE, and a second value for the first quantity of measurement occasions is associated with a second power consumption of the UE.

25. An apparatus for wireless communications at a user equipment (UE), comprising:

means for receiving control signaling indicating a first beam sweeping occasion within a search time period and a first paging occasion within the search time period;

means for selecting a first quantity of measurement occasions of the first beam sweeping occasion for monitoring of a first plurality of beams based at least in part on a channel quality metric observed for a prior beam during a prior beam sweeping occasion, wherein the first quantity of measurement occasions differs from a second quantity of measurement occasions associated with the prior beam sweeping occasion;

means for selecting a first beam of the first plurality of beams to monitor for a first paging message during the first paging occasion based at least in part on a first plurality of channel quality metrics observed for the first plurality of beams during the first quantity of measurement occasions; and means for monitoring for the first paging message during the first paging occasion using the first beam.

26. The apparatus of claim 25, further comprising:

means for receiving the control signaling indicating a second beam sweeping occasion within the search time period and a second paging occasion within the search time period;

means for selecting a third quantity of measurement occasions of the second beam sweeping occasion for monitoring of a second plurality of beams based at least in part on the channel quality metric observed for the first beam during the first beam sweeping occasion;

means for selecting a second beam of the second plurality of beams to monitor for a second paging message during the second paging occasion based at least in part on a second plurality of channel quality metrics observed for the second plurality of beams during the third quantity of measurement occasions; and means for monitoring for the second paging message during the second paging occasion using the second beam.

27. The apparatus of claim 26, further comprising:

means for comparing the channel quality metric observed for the first beam during the first beam sweeping occasion to one or more thresholds, wherein selecting the third quantity of measurement occasions is based at least in part on the comparison.

28. A non-transitory computer-readable medium storing code for wireless communications at a user equipment (UE), the code comprising instructions executable by at least one processor to:

receive control signaling indicating a first beam sweeping occasion within a search time period and a first paging occasion within the search time period;

select a first quantity of measurement occasions of the first beam sweeping occasion for monitoring of a first plurality of beams based at least in part on a channel quality metric observed for a prior beam during a prior beam sweeping occasion, wherein the first quantity of measurement occasions differs from a second quantity of measurement occasions associated with the prior beam sweeping occasion;

select a first beam of the first plurality of beams to monitor for a first paging message during the first paging occasion based at least in part on a first plurality of channel quality metrics observed for the first plurality of beams during the first quantity of measurement occasions; and monitor for the first paging message during the first paging occasion using the first beam.

29. The non-transitory computer-readable medium of claim 28, wherein the instructions are further executable by the at least one processor to:

receive the control signaling indicating a second beam sweeping occasion within the search time period and a second paging occasion within the search time period;

select a third quantity of measurement occasions of the second beam sweeping occasion for monitoring of a second plurality of beams based at least in part on the channel quality metric observed for the first beam during the first beam sweeping occasion;

select a second beam of the second plurality of beams to monitor for a second paging message during the second paging occasion based at least in part on a second plurality of channel quality metrics observed for the second plurality of beams during the third quantity of measurement occasions; and monitor for the second paging message during the second paging occasion using the second beam.

30. The non-transitory computer-readable medium of claim 29, wherein the instructions are further executable by the at least one processor to:

compare the channel quality metric observed for the first beam during the first beam sweeping occasion to one or more thresholds, wherein selecting the third quantity of measurement occasions is based at least in part on the comparison.

* * * * *